United States Patent Office 3,141,633
Patented July 21, 1964

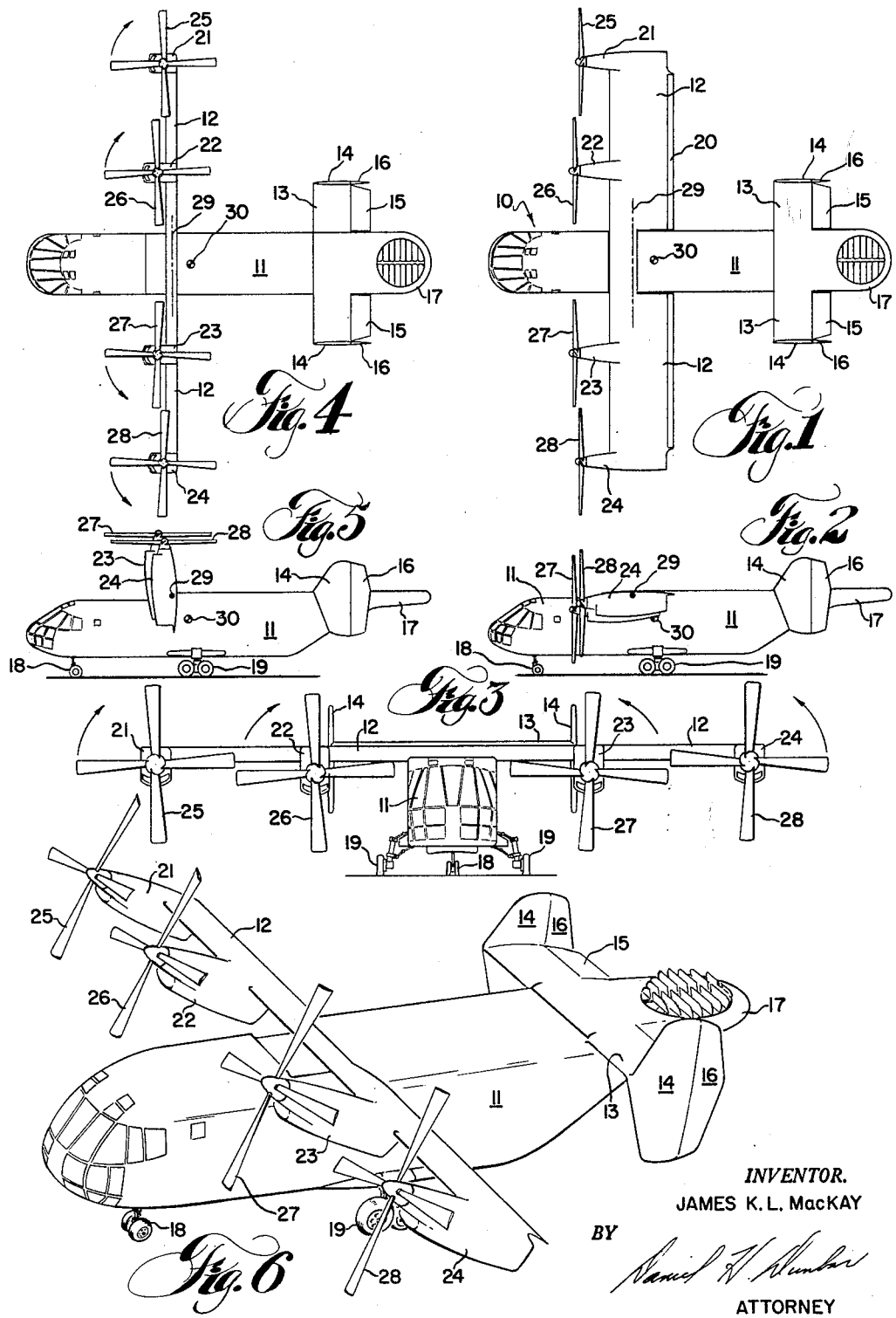

3,141,633
TILT-WING AIRCRAFT
James K. L. MacKay, Columbus, Ohio, assignor to
North American Aviation, Inc.
Filed Nov. 5, 1962, Ser. No. 235,389
6 Claims. (Cl. 244—7)

This invention relates generally to aircraft, and particularly concerns aircraft having vertical take-off and landing (VTOL) capabilities. The invention is particularly important with respect to VTOL-type aircraft that use a tilt-wing concept or component, as distinguished from deflected slipstream or ducted-fan concepts or components or the like, in attaining vertical or hovering flight.

The invention described and claimed herein is basically a tilt-wing aircraft with a wing span that is terminated by outboard nacelles; such nacelles house power plant units employed to drive propeller assemblies provided in the aircraft to effect vehicle propulsion. In addition, the invention requires that the air vehicle propeller assemblies be rotated in particular directions in order that the advantages obtainable by the invention might be realized. The instant invention involves propeller rotation in a manner whereby each propeller blades tip moves downwardly with respect to the tilt-wing upper surface in that portion of each area swept-out by the various rotating propeller blades that is nearest to the aircraft fuselage.

It is a primary object of this invention to provide a tilt-wing aircraft with improved performance capabilities relating to a vertical or hovering flight to forward flight mode of operation and relating to a forward flight to vertical or hovering flight mode of operation.

Another object of this invention is to provide a tilt-wing aircraft with an improved stall margin in transition modes of flight to permit increased deceleration and steeper descent flight qualities.

Another object of this invention is to provide a tilt-wing aircraft with features which develop reduced wing surface stall areas during transition modes of flight, particularly at higher transition flight speeds.

A still further object of this invention is to provide a tilt-wing aircraft with features which obtain an improved stall margin and which may be combined with wing leading edge and trailing edge components that develop added flight capability and stability during transition modes of operation.

Other objects and advantages of this invention will become apparent during consideration of the following description and drawings.

In the drawings:

FIG. 1 is a plan view of a preferred embodiment of the tilt-wing aircraft of this invention with the wing component thereof oriented in a position for forward flight;

FIG. 2 is a side elevational view of the aircraft shown in FIG. 1;

FIG. 3 is a front elevational view of the aircraft shown in FIG. 1;

FIGS. 4 and 5 are plan and side elevational views, respectively, of the aircraft of FIGS. 1 through 3 but with the wing component thereof oriented in a position suitable for vertical or hovering flight; and FIG. 6 is a perspective view of the aircraft of this invention in a transition mode of flight operation.

A preferred embodiment of an air vehicle having the features of this invention is illustrated in the drawings and is referenced generally as 10. Aircraft 10 has a fuselage 11 which is typically adapted for carrying passengers, cargo, or the like in addition to required operating personnel. A tilt-wing 12 is mounted at the upper portion of fuselage 11 and provides the required lift for aircraft 10 during forward flight operation. The empennage portion of aircraft 10 is provided with an all-movable horizontal stabilizer 13, vertical stabilizers 14, elevators 15, and rudders 16. Flight control surfaces 13 through 16 provide typical longitudinal and directional flight attitude stabilization and control functions. Aircraft 10 additionally incorporates a shrouded and louvered pitch fan 17 which preferably develops lift during take-off and landing operations as well as pitch control with a minimum power loss to the power plant system for the aircraft. In forward flight pitch fan 17 is normally disengaged from the aircraft power plant system. Nose landing gear 18 and main landing gear 19 are also typically included as a part of aircraft 10.

Tilt-wing assembly 12 is also provided with full-span Fowler-type flaps 20 for achieving lateral flight control. In addition, tilt-wing assembly 12 carries the power plant nacelles designated 21 through 24. Multi-bladed propellers 25 through 28 are driven by the power plants contained within nacelles 21 through 24, respectively. Tilt-wing assembly 12 rotates from its forward flight position to its vertical or hovering flight position about the wing pivot axis designated 29. Actuator means for rotating tilt-wing 12 about axis 29 is not shown in the drawings because it is considered of conventional design. The aircraft center of gravity 30 is located aft of wing pivot axis 29 a sufficient distance whereby the moment developed by fan 17 normally counterbalances the moment developed by the thrust of propellers 25 through 28 when the wing is in its full vertical position.

Tilt-wing 12 is highly cambered and may have a typical section such as NACA $63_{2A}$–415. The full-span Fowler flaps designated 21 may be of approximately 40% chord length and may be capable of 30° deflection. Leading edge devices (not shown) such as leading edge flaps or leading edge droops may be advantageously incorporated in tilt-wing assembly 12 to further improve transition mode of flight operation performance characteristics. Nacelles 21 through 24 are streamlined as much as possible and are carried by tilt-wing 12 in a conventional manner. The configuration of each nacelle is dictated largely by the external configuration of the individual power plant units housed therein.

Propeller assemblies 25 through 28 are preferably selected to provide optimum performance for given missions. If relatively short radius missions are involved, highly cambered propeller blades for each assembly and with a high figure of merit may be selected, Propeller blade tip overlap is not introduced if otherwise associated static thrust losses are to be avoided. One version of aircraft 10 is based upon the use of T64–GE–6 turbo-shaft engines and compatible gear reduction boxes to drive propeller assemblies 25 through 28. Each such engine or power plant incorporates an axial-flow, variable-stator, high-pressure ratio compressor section, a through-flow annular combustion chamber section, a two-stage axial-flow gas generator turbine section, and an independent two-stage axial-flow power turbine section. Such engines each operate at a nominal output speed of 13,640 r.p.m.

Direction of propeller blade or tip rotation is an important aspect of this invention. It is mandatory that the propeller tips move downwardly with respect to the upper surface of tilt-wing 12 in that portion of each area swept-out by the various rotating propeller blades that is nearest to fuselage 11 if the maximum advantage obtainable by practice of the invention is to be realized. The desired directions of rotation for propeller assemblies 25 through 28 are shown by the arrows in FIG. 3. As viewed from the front of vehicle 10, propeller assemblies 25 and 26 rotate in a clockwise direction; propeller assemblies 27 and 28 are preferably rotated in a counterclockwise direction. It is also important that the surface area of tilt-wing 12 terminate, spanwise, at outboard power plant nacelles. Such outboard nacelles are designated 21 and 24 in the drawings. With these features incorporated in aircraft 10, improved performance characteristics related to aircraft transition mode of flight operation may be obtained. Such improved performance characteristics may be measured by reduced wing surface stalled area, increased deceleration-descent capabilities, and improved aircraft stability during the before-mentioned transition modes of flight operation. Such modes include transition from forward to vertical or hovering flight as well as transition from vertical or hovering flight to forward flight.

The specified direction of rotation for outboard propeller assemblies 25 and 28 provides two desirable end results. First, the local angle of attack is reduced over the wing next to the related nacelles, thereby keeping the propeller blade tips in an unstalled condition. Second, the preferred directions of outboard unit propeller blade rotation correspond to the direction of rotation of associated wing tip vortices and thereby increase wing drag. The resulting increased drag is a highly desirable characteristic for developing deceleration or descent capability in a tilt-wing VTOL-type aircraft. Also, particular attention should be given to the separate performance improvements which are obtained by proper rotation of incorporated inboard propeller assemblies such as 26 and 27 of the drawings.

Data is herein presented to illustrate the nature and magnitude of the improved results which may be obtained in a tilt-wing aircraft through the propeller asesmbly rotation practices of this invention, especially as related to the direction of rotation of inboard propeller assemblies corresponding to units 26 and 27. For a given airplane configuration the improvement obtained by proper rotation of propeller components can be measured in part by improvements to the resulting aircraft coefficient of lift. With a given hovering and transition thrust coefficient ($T_c''$) of 0.7, corresponding to a forward flight speed of 50 knots, improvements in the airplane wing lift coefficient based on total dynamic pressure ($C_L''$) are as follows. At a total dynamic pressure longitudinal force coefficient ($C_x''$) value of $-0.10$ (deceleration) a lift coefficient of 1.38 associated with upward propeller tip movement relative to the tilt wing upper surface and at the fuselage junction may be improved to a lift coefficient of 1.47 by changing only the direction of rotation of assemblies 26 and 27 to correspond to the directions illustrated in FIG. 3. For a longitudinal force coefficient value of $-0.18$ an improvement in coefficient of lift of from 1.26 to 1.40 may be realized under similar thrust and configuration conditions. In each instance, propeller assemblies 25 and 28 were rotated at the same time and in the directions shown in FIG. 3. Improvements in realized coefficient of lift at similar negative longitudinal force coefficient values may also be realized for aircraft operation at hovering and transition thrust coefficient values of 0.4, corresponding to a flight speed of approximately 65 knots. For instance, at a longitudinal force coefficient value of $-0.18$, and with a similar aircraft configuration, the preferred directions of inboard propeller assembly rotation will improve the coefficient of lift from approximately 1.47 to 1.73. Thus, it may be concluded that important lift advantages are to be realized by the practice of this invention, particularly at higher transition speeds.

Similar data has been developed to show the effectiveness of terminating the tilt-wing span at the illustrated outboard power plant nacelles 21 and 24. In the following information a comparison is made with comparison data developed from an installation wherein the wing span was extended beyond the outboard nacelles. Direction of propeller rotation was held constant and was in accordance with the teachings of this invention. At a longitudinal force coefficient ($C_x''$) value of approximately $-0.1$ (deceleration) and utilizing a hovering and transition thrust coefficient of 0.7, corresponding to an airplane speed of approximately 50 knots, the wing coefficient of lift ($C_L''$) was increased from 1.27 to 1.47 by reducing the wing span to a length in accordance with the instant teaching. In similar operation comparisons but at a longitudinal force coefficient value of $-0.2$, the coefficient of lift was increased from 1.13 to 1.32. Even more important, the values of the coefficient of lift were increased substantially from the 1.47 and 1.32 improvement values by operation at a thrust coefficient of 0.4, corresponding to approximately 65 knots forward speed. In this instance the shortened wing developed a coefficient of lift of approximately 1.73.

The improvement in descent-deceleration capability obtained by practice of the instant invention may also be analyzed in terms of a deceleration or descent capability index. The maximum obtainable steepness of descent cna be measured by the ratio of $C_x''$ to $C_L''$. Because it is difficult (and undesirable) to operate the airplane beyond the stall point, the value of $C_x''/C_L''$ at the stall or maximum $C_x''$ point establishes a measure of deceleration or descent capability. A large corresponding ratio is desired in VTOL-type aircraft. Examination of available stability and control data shows that the instant invention functions to significantly improve the ratio. The following data examples are given. For an airplane configuration corresponding to that used for obtaining the performance data reported above, and wherein (1) the tilt-wing span terminates at a distance outboard of the aircraft outboard power plant nacelles and (2) the best possible direction of propeller assembly rotation is utilized, a ratio of $-0.036$ is obtained for a thrust coefficient of 0.7. However, for a similar thrust coefficient and for a similar airplant configuration except that tilt-wing span termination and propeller assembly rotation features are in accordance with this invention, an improved ratio of $-0.075$ at the stall condition is obtained. For similar comparisons but at a thrust coefficient of 0.4, the descent capability index at stall may be improved from $-0.063$ to 0.116. The 0.116 value utilizes aircraft construction details and operation in accordance with the instant invention as distinguished from use of a long span tilt-wing (terminated at appreciable distances outboard of the outermost power plant nacelles) with best possible propeller rotation.

The improvement in descent-deceleration capability obtained by practice of the instant invention is also illustrated by obtained data. Maximum realized deceleration may be improved from 2 feet per second per second to 3.6 feet per second per second for a transition thrust coefficient of 0.4 (65 knots) by changing the direction of inboard propeller rotation to conform to the feature of this invention. Such improvement is based upon measurements involving a rate of descent of 1500 feet per minute and with a tilt-wing which incorporated leading edge droop devices. Outboard propeller assembly rotation was in the directions specified in FIG. 3 in both instances.

It is to be understood that the forms of the invention herewith shown and described are to be taken as preferred embodiments of the same, but that various changes in the proportioning, size, and detail of parts may be resorted to without departing from the spirit of the invention or the scope of the subjoined claims.

I claim:
1. In an aircraft: a fuselage, a tilt-wing joined to said fuselage, nacelles attached to and carried by said tilt-wing, power plants contained within said nacelles, and propellers rotated by said power plants, said tilt-wing having a span which is terminated at each extreme by a nacelle, and each of said propellers being rotated in a direction whereby the tips of said propeller approach the upper surface of said tilt-wing in a downwardly manner in those portions of the area swept-out by said propeller which is nearest to said fuselage.

2. In an aircraft: a fuselage, a tilt-wing joined to said fuselage, power plants carried by said tilt-wing, and propellers rotated by said power plants, said tilt-wing having a span which is terminated at each extreme adjacent a power plant, and each of said propellers being rotated in a direction whereby the tips of said propeller approach the upper surface of said tilt-wing in a downwardly manner in those portions of the area swept-out by said propeller which is nearest to said fuselage.

3. In a VTOL-type aircraft, in combination: a fuselage, a wing rotatably joined to said fuselage for forward and vertical flight capabilities and extended laterally outwardly from said fuselage in opposite directions, inboard nacelles and outboard nacelles carried by said wing, a power plant unit within each of said nacelles, and a propeller assembly having propeller blade components coupled to and rotated by each of said power plant units, said outboard nacelles being located at the outboard lateral extremes of said wing, and said power plant units being operated to rotate said propeller assembly blade components in directions which cause said propeller assembly blade components to approach the upper surface of said wing in a downwardly manner in those portions of the areas swept-out by said propeller assembly blade components which are nearest to said fuselage.

4. In a VTOL-type aircraft, in combination: a fuselage, a wing rotatably joined to said fuselage for forward and vertical flight capabilities and extended laterally outwardly from said fuselage in opposite directions, inboard power plant units and outboard power units carried by said wing, and a propeller assembly having propeller blade components coupled to and rotated by each of said power plant units, said outboard power plant units being located at the spanwise extremes of said wing, said outboard and inboard propeller assemblies being rotated in a direction whereby said propeller assembly propeller blade components approach the upper surface of said wing in a downwardly manner in those portions of the areas swept-out by said propeller blade components which are nearest to said fuselage.

5. In a VTOL-type aircraft, in combination: a fuselage, a tilt-wing for effecting forward and vertical flight capabilities and having right and left portions as viewed from the front of said fuselage, an inboard and an outboard rotatable propeller assembly carried by each of said wing portions, and means for rotating said propeller assemblies, said outboard propeller assemblies being located so that their axes of rotation are adjacent the outboard extremes of said wing portions, said tilt-wing left portion propeller assemblies being rotated in a clockwise direction as viewed from the front of said fuselage, and said tilt-wing right portion propeller assemblies being rotated in a counter-clockwise direction as viewed from the front of said fuselage.

6. In a VTOL-type aircraft, in combination: a tilt-wing for effecting forward and vertical flight capabilities and having right and left portions as viewed from the front of said aircraft, an inboard and an outboard propeller assembly carried by each of said wing portions, and means for rotating said propeller assemblies, said outboard propeller assemblies being located at the outboard extremes of said tilt-wing right and left portions, said tilt-wing left portion outboard and inboard propeller assemblies being rotated in a clockwise direction when viewed from the front of said aircraft, and said tilt-wing right portion inboard and outboard propeller assemblies being rotated in a counter-clockwise direction when viewed from the front of said aircraft.

References Cited in the file of this patent

UNITED STATES PATENTS 3,073,547　　Fischer ------------------ Jan. 15, 1963

FOREIGN PATENTS 796,031　　France ------------------ Jan. 17, 1936
914,954　　France ------------------ July 1, 1946
811,840　　Great Britain ----------- Apr. 15, 1959

OTHER REFERENCES

Aviation Week, page 69, June 11, 1962.